Figure 1:
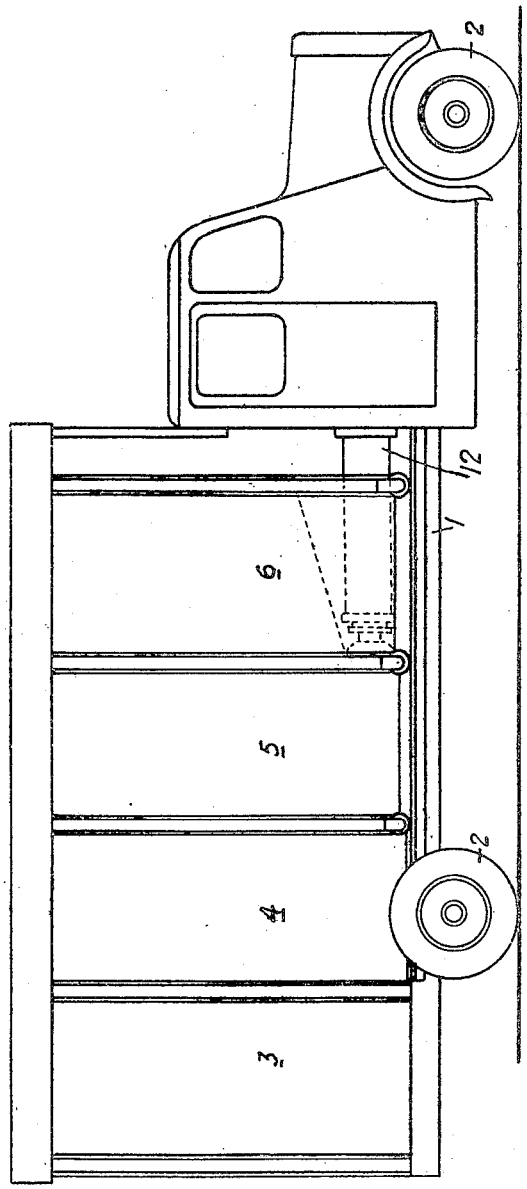

Jan. 3, 1950     T. W. DUNSTAN     2,493,236
HYDRAULICALLY ADJUSTABLE VEHICLE BODY
Filed Jan. 4, 1946     3 Sheets-Sheet 1

Inventor
THOMAS WILLIAM DUNSTAN
by
Attorney

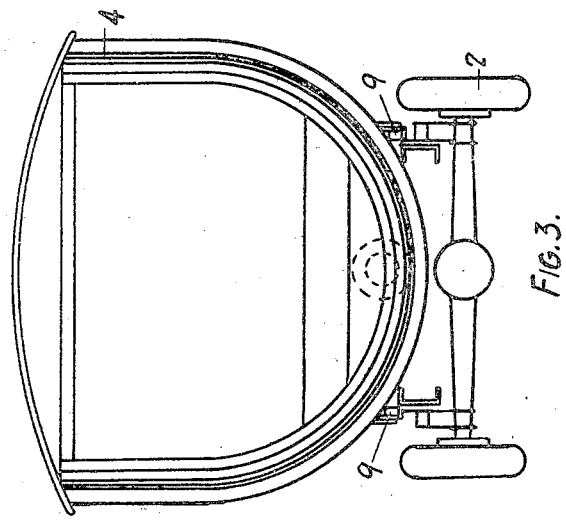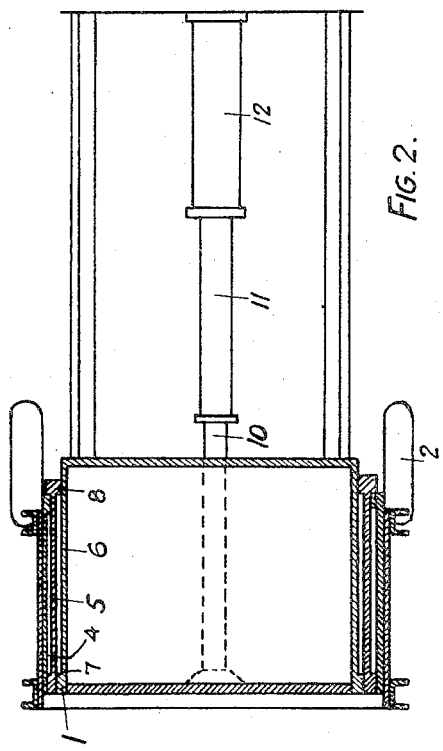

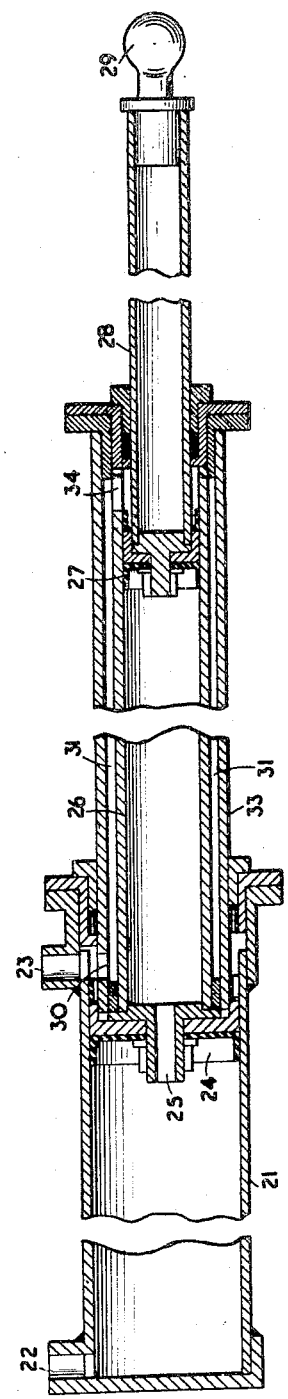

Patented Jan. 3, 1950

2,493,236

UNITED STATES PATENT OFFICE 2,493,236

HYDRAULICALLY ADJUSTABLE VEHICLE BODY

Thomas William Dunstan, Wigan, England, assignor to Walker Brothers (Wigan) Limited, Wigan, England, a British company Application January 4, 1946, Serial No. 639,118
In Great Britain December 21, 1945

1 Claim. (Cl. 214—83.24)

The present invention relates to improvements in vehicles of the type in which the frame of the vehicle supports a storage chamber displaceable relatively to the vehicle frame to facilitate the loading or unloading of a load.

According to the present invention part or the whole of a storage chamber on a vehicle is displaceable relatively to the frame of the vehicle by a telescopic hydraulic or pneumatic link, at least one element of which is double-acting so that the movable element, whilst being displaceable within limits in one direction is also positively displaceable within the same limits or a lesser range in the opposite direction.

The invention is further described with reference to the accompanying diagrammatic drawings, in which—

Fig. 1 is a side elevation, partly in section, of a vehicle in one form of construction, Fig. 2 is a corresponding part plant view, Fig. 3 is a corresponding end view, Fig. 4 is a sectional elevation of one form of hydraulic link.

A vehicle, which may either be a wheeled vehicle to be towed behind a horse or mechanically propelled tractor or may be a self-propelled vehicle as shown in Fig. 1, has a frame 1 supported on wheels 2, which frame 1 may be of the type having a plurality of semi-cylindrical compartments 3, 4, 5, 6, the sides and floors of which may telescope one over the other as shown collapsed in Fig. 2. The telescopic elements 4, 5, 6, may be interconnected by stop means such as 7, 8, and the innermost element 6 connected directly to a plunger 10 of a telescopic hydraulic link unit 10, 11, 12, the element 12 being mounted rigidly on the frame 1 of the vehicle. Two such hydraulic links may be provided one on each side of the telescopic elements for the positive displacement of these.

In use, for instance for the collection of refuse could be dumped from the end of the vehicle on to the floor of the innermost section 6, whereupon this can be drawn forward by its own length by allowing fluid pressure to act on the rear end of element 10, this element being double acting. The floor of the section 5 is then exposed and so forth until the whole sections 4, 5, 6, are filled, whereupon the remaining refuse can be dumped upon the floor of the section 3 which is not movable.

It will be seen that by reason of the cylinders 11, 12 having inlet and outlet connections (not shown) at both ends, the load so accumulated within the body can be discharged or dumped from the end of the body when desired by forcing rearwardly the section 6 and then the section 5 and so forth.

One form of suitable telescopic hydraulic link is shown in Fig. 4 by way of example, in which a cylinder 21 has connections 22, 23, at opposite ends which can alternately be coupled to a source of fluid pressure, usually hydraulic, or alternatively connected to exhaust. Within the cylindrical element 21 is disposed a piston 24 having an axial passage 25 leading to the interior of a telescopic element 26 in which operates a piston 27 for a hydraulic ram element 28, the end of which 29 may be coupled to the part to be displaced, that is to say the collapsible section 6 (Fig. 1). It will consequently be seen that as the telescopic link (Figure 4) includes two double acting elements it can be expanded positively to its full length substantially equal to the length of the three sections, and can also be positively withdrawn to its minimum length equal to substantially the length of a single section.

I declare that what I claim is:

A vehicle body including a fixed frame, a plurality of nesting telescopic floor compartments assembled a smaller within a larger, a stop on the outer side of each compartment at one end, a cooperating stop on the inner end of a compartment nested therewith, and double acting hydraulic means connected between the innermost nested compartment and the fixed frame to draw out or to collapse the nested compartments telescopically in turn to form a storage chamber of variable length and volume.

THOMAS WILLIAM DUNSTAN.

REFERENCES CITED

The following references are of record in the file of this patent:

UNITED STATES PATENTS

| Number | Name | Date |
|---|---|---|
| 1,891,885 | Tapp et al. | Dec. 20, 1932 |
| 1,908,899 | Kayel et al. | May 16, 1933 |
| 2,103,128 | Walter | Dec. 21, 1937 |
| 2,166,722 | Kirksey | July 18, 1939 |
| 2,339,039 | Wood | Jan. 11, 1944 |